United States Patent [19]
Walding et al.

[11] 3,882,289
[45] May 6, 1975

[54] BINARY CODED ROTARY WAFER TYPE SWITCH ASSEMBLY

[75] Inventors: Eugene C. Walding, Arlington Heights; John G. Cummings, Cary, both of Ill.

[73] Assignee: Oak Industries, Inc., Crystal Lake, Ill.

[22] Filed: Feb. 28, 1972

[21] Appl. No.: 229,712

[52] U.S. Cl. .......... 200/11 D
[51] Int. Cl. .......... H01h 19/58
[58] Field of Search .......... 200/11 D

[56] References Cited

UNITED STATES PATENTS

| | | | |
|---|---|---|---|
| 3,215,790 | 11/1965 | Young | 200/11 D |
| 3,215,790 | 11/1965 | Young | 200/11 D |
| 3,242,270 | 3/1966 | Van Volkenburg et al. | 200/11 D |
| 3,268,674 | 8/1966 | Golbeck et al. | 200/11 D |
| 3,457,379 | 7/1969 | Meadows et al. | 200/11 D |

*Primary Examiner*—James R. Scott
*Attorney, Agent, or Firm*—Kinzer, Plyer, Dorn & McEachran

[57] ABSTRACT

A means for determining position of a rotary television channel selector switch having at least 26 finite positions includes rotary and stationary coding means, with the rotary means moving with the channel selector switch. The stationary means has a single input and five outputs, with the connections between the input and outputs varying according to switch position.

2 Claims, 4 Drawing Figures

BINARY CODED ROTARY WAFER TYPE SWITCH ASSEMBLY

SUMMARY OF THE INVENTION

The present invention relates to a system for indicating the position of a television channel selector switch and has particular application in the field of cable television or pay television in which it is desirable to know, at a central station, which television sets are tuned to a particular channel or channels.

A primary purpose of the invention is a coding system of the type described which cooperates with the television channel selector switch to provide output bits indicative of the position of the switch.

Another purpose is a system of the type described which uses a Gray code for providing output bits indicative of the position of the channel selector switch.

Another purpose is a system for indicating, at a remote location, the position of the channel selector switch in which the bits on the output lines change by an order of one when the switch is moved from one position to its adjacent position.

Another purpose is a reliably-operable simply constructed system for determining position of a television channel selector switch.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figures 1, 2, 3, 4:
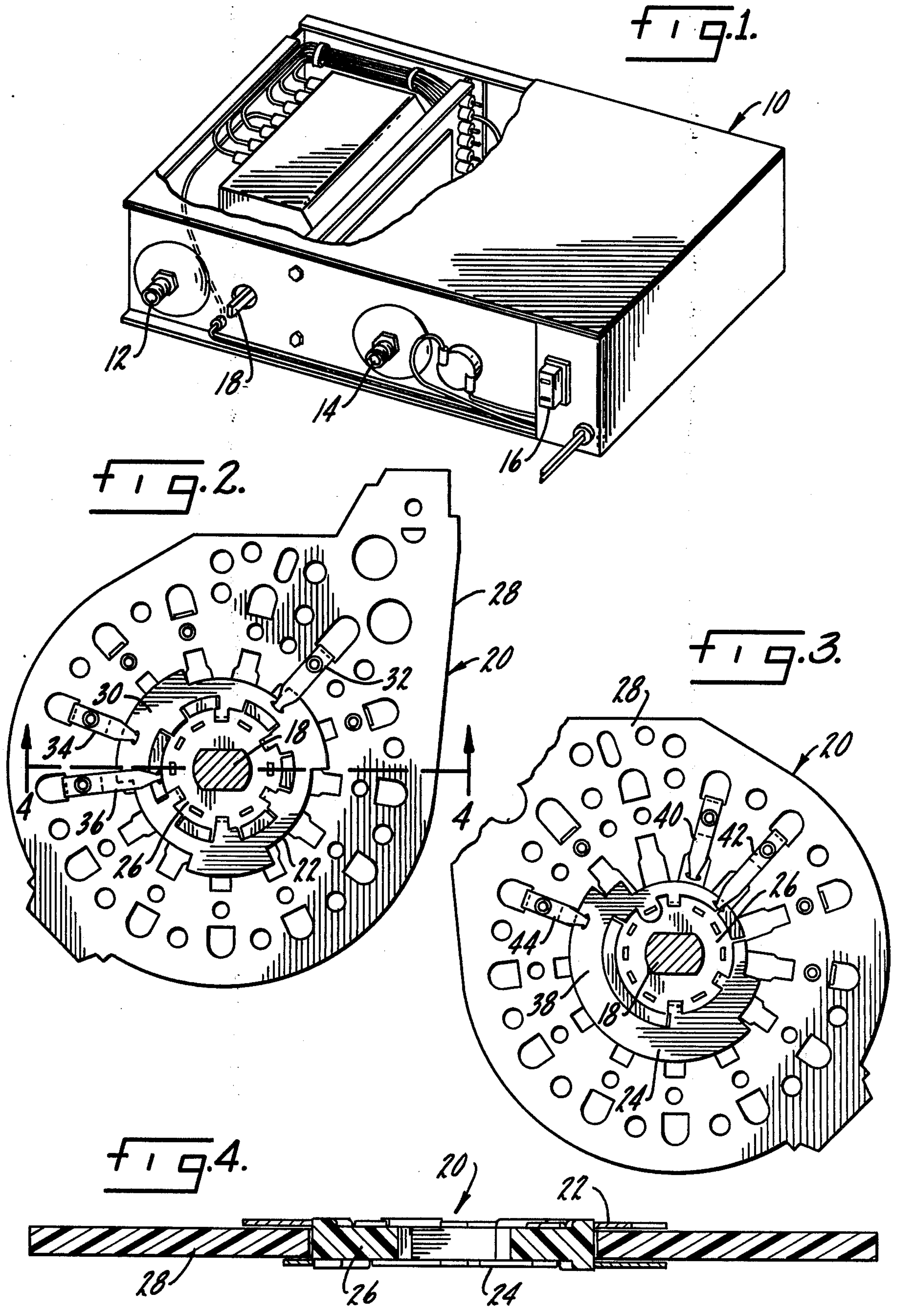
FIG. 1 is a perspective of a cable television converter.
FIG. 2 is a side view of one side of the switch section rotor and stator.
FIG. 3 is a side view of the opposite side of the switch section rotor and stator.
FIG. 4 is a section along plane 4—4 of FIG. 2.

In the field of cable television, other forms of pay television, as well as in audience rating systems, it is necessary to know to what channel a particular television set is tuned. Preferably this information should be automatically sent back to a central station or monitoring area so that the positions of a multitude of channel selector switches can be monitored on a periodic basis. The present invention is described in connection with a cable television converter and includes a switch section which is mounted on the television channel selector shaft to provide an output code indicative of the position of the channel selector switch. The output code, which may be determined by the presence or absence of a voltage on five different output lines, may be transmitted back to the central station or monitoring area by a variety of means. For example, frequency modulation or amplitude modulation systems may be used. The means to transmit the coded information back to the central station is not important. What is important is the particular coding means for providing a plurality of outputs which are indicative of the position of the television channel selector switch.

In FIG. 1, the housing or casing of a "set top" cable television converter is indicated at 10. The input cable connection is indicated at 12 and the output cable connection is indicated at 14. An AC power receptacle is indicated at 16 and the shaft 18 will normally mount the channel selector knob. Rotation of the shaft 18 is effective to change the channel being viewed by the television set and in addition to the various oscillators and other components necessary for tuning in the different channels, the channel selector switch shaft 18 will mount a switch section devoted to providing coded information as to the position of the selector switch shaft.

The invention uses what is known as a "Gray" code for providing the necessary information as to the selector switch shaft position. In a Gray code there are five output lines and a single input line, with the connections between the input and the outputs determining which output lines have voltages present on them or which output lines provide useful "bits" of information.

FIGS. 2, 3 and 4 show the switch section providing the coded information indicative of the position of the channel selector switch shaft. Turning particularly to FIG. 4, the rotor 20 includes rotor elements 22 and 24 separated by an insulating layer 26. The stator is indicated at 28 and, as is customary in rotary switches, surrounds the rotor. There are contact arms, described hereinafter, on the stator which extend over and into position relative to contact areas on the rotor elements.

Rotor element 22 is indicated in FIG. 2 and the irregular rotor contact area is indicated at 30. There are three arms, designated at 32, 34 and 36, which are fastened in a conventional manner to the stator and extend over and are positioned to be in contact with the contact area of the rotor at predetermined positions of the channel selector switch shaft.

FIG. 3 shows rotor element 24. The irregular contact area is indicated at 38 and the stator arms are indicated at 40, 42 and 44.

The six stator arms and the irregular rotor contact areas provide a coding arrangement in which the contact arm representing the input is selectively connected to the different output arms so that at each position of the channel selector switch shaft there is a different combination of outputs from the five output lines.

In a 26-position channel selector switch, there will be a different coded output for each position of the switch. Set out below in table form are the various television channels, channels 2–13 and A–L and the coded outputs relating thereto. The output lines corresponding to five of the stator contact arms have been designated as lines E, D, C, B and A. A "zero" indicates an absence of voltage or no connection between a particular output and the input. A "one" indicates the presence of a nominal voltage, or a bit, or a connection between the output line and the input line. Of advantage in the Gray code is that a change in position between adjacent television channels only changes the output on one line, substantially reducing the possibility of error. For example, on channel 5 there will only be a voltage on output lines C and A. Channel 4 has an output voltage on lines C, B and A, a change in one output line from Channel 5. In like manner, Channel 6 only has an output voltage on line C, again a change in one output line from Channel 5. Note that Channel N, the 26th channel, has an output voltage on lines E and B and that Channel 2, the first channel, only has an output voltage on line B, again a change in output voltage on only one line.

| CHANNEL | LINE NUMBER | | | | |
|---|---|---|---|---|---|
| | E | D | C | B | A |
| 2 | 0 | 0 | 0 | 1 | 0 |
| 3 | 0 | 0 | 1 | 1 | 0 |
| 4 | 0 | 0 | 1 | 1 | 1 |
| 5 | 0 | 0 | 1 | 0 | 1 |
| 6 | 0 | 0 | 1 | 0 | 0 |
| 7 | 0 | 1 | 1 | 0 | 0 |
| 8 | 0 | 1 | 1 | 0 | 1 |
| 9 | 0 | 1 | 1 | 1 | 1 |
| 10 | 0 | 1 | 1 | 1 | 0 |
| 11 | 0 | 1 | 0 | 1 | 0 |
| 12 | 0 | 1 | 0 | 1 | 1 |
| 13 | 0 | 1 | 0 | 0 | 1 |
| A | 0 | 1 | 0 | 0 | 0 |
| B | 1 | 1 | 0 | 0 | 0 |
| C | 1 | 1 | 0 | 0 | 1 |
| D | 1 | 1 | 0 | 1 | 1 |
| E | 1 | 1 | 0 | 1 | 0 |
| F | 1 | 1 | 1 | 1 | 0 |
| G | 1 | 1 | 1 | 1 | 1 |
| H | 1 | 1 | 1 | 0 | 1 |
| I | 1 | 1 | 1 | 0 | 0 |
| J | 1 | 0 | 1 | 0 | 0 |
| K | 1 | 0 | 1 | 0 | 1 |
| L | 1 | 0 | 1 | 1 | 1 |
| M | 1 | 0 | 1 | 1 | 0 |
| N | 1 | 0 | 0 | 1 | 0 |

In a Gray code of five lines, there are 32 possible combinations. However, in order to provide a change in only one output line between adjacent positions, it is necessary to eliminate certain of the possible combinations and only to select the 26 different combinations which provide a change in only one bit from one position to the next adjacent position.

As indicated above, the particular coded information may be sent back to the central station or monitoring area by a variety of means. Normally, the information will be sent back over the same cable which provides television signals, although in audience rating systems it may be desirable to have a telephone line connection between the particular television set being monitored and the central station.

Although the invention has been described in connection with a particular switch section as the coding means, it is within the scope of the invention to use a printed circuit arrangement rather than a conventional rotary switch arrangement.

Whereas the preferred form of the invention has been shown and described herein, it should be realized that there may be many modifications, substitutions and alterations thereto.

We claim:

1. In a television receiving means, a rotary channel selector switch having a shaft, rotor means mounted on said shaft, a stator positioned about said rotor, said stator having five of output lines and only one input line, said selector switch having at least 26 finite positions, said rotor means and stator having cooperative contact areas such that the input line is connected to different combinations of said output lines for each position of the channel selector switch shaft and such that there is a change in the condition of only one output line each time the switch shaft is moved from one position to an adjacent position, the condition of the output lines providing a coded indication of switch position.

2. The structure of claim 1 further characterized in that said rotor means includes a pair of rotor elements and a layer of insulation positioned therebetween, each of said rotor members having defined contact areas, and a plurality of contact arms on said stator positioned to contact said rotor elements.

* * * * *